US009391356B2

(12) United States Patent
Rochblatt

(10) Patent No.: US 9,391,356 B2
(45) Date of Patent: Jul. 12, 2016

(54) FEATURE IN ANTENNA PATTERN FOR POINTING AND ORIENTATION DETERMINATION

(71) Applicant: David Rochblatt, Long Beach, CA (US)

(72) Inventor: David Rochblatt, Long Beach, CA (US)

(73) Assignee: California Institute of Technology, Pasadena, CA (US)

( * ) Notice: Subject to any disclaimer, the term of this patent is extended or adjusted under 35 U.S.C. 154(b) by 462 days.

(21) Appl. No.: 13/912,186

(22) Filed: Jun. 6, 2013

(65) Prior Publication Data

US 2013/0328721 A1 Dec. 12, 2013

Related U.S. Application Data

(60) Provisional application No. 61/656,433, filed on Jun. 6, 2012.

(51) Int. Cl.
*H01Q 3/00* (2006.01)
*G01S 13/00* (2006.01)
*H01Q 1/12* (2006.01)

(52) U.S. Cl.
CPC .................................. *H01Q 1/1257* (2013.01)

(58) Field of Classification Search
CPC ................................ H01Q 1/125; H01Q 3/08
USPC .............. 342/76, 77, 359, 420, 427; 343/757, 343/758
See application file for complete search history.

(56) References Cited

U.S. PATENT DOCUMENTS 6,163,296 A * 12/2000 Lier ....................... H01Q 3/267 342/154
2013/0271321 A1* 10/2013 Anderson ............ H01Q 13/025 342/368

OTHER PUBLICATIONS

Clarricoats et al., "Corrugated horns for microwave antennas," 1984, pp. 102-103,114-115, Peter Peregrinus Ltd., London, UK.
Ludwig, "The definition of cross polarization," IEEE Transactions on Antennas and Propagation, vol. 21, No. 1, Jan. 1973, pp. 116-119.
Hanfling, "Aperture Fields of Paraboloidal Reflectors by Stereographic Mapping of Feed Polarization," IEEE Trans. Antennas Propagat, vol. AP-18, May 1970, pp. 392-396.
Love et al., "Reflector Antennas," IEEE Press, 1978, pp. 190-191, 210.

* cited by examiner

*Primary Examiner* — Dao Phan
(74) *Attorney, Agent, or Firm* — Canady & Lortz LLP; Bradley K. Lortz

(57) ABSTRACT

Systems and methods for antenna pointing are disclosed. A transmit antenna system having an adjustable boresight transmits a signal exhibiting a far-field pattern including a feature (e.g. a V-Notch) in a polarization of the signal disposed at a fixed position off a beam peak of the far-field pattern of the signal. A receive antenna system scans across the far-field pattern of the signal in the polarization to locate the feature and determine a pointing error of the adjustable boresight therefrom. The system may be applied to a cross-polarization of the signal where a co-polarization of the signal is simultaneously used for telecommunication.

18 Claims, 5 Drawing Sheets

FEATURE IN ANTENNA PATTERN FOR POINTING AND ORIENTATION DETERMINATION

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 61/656,433, filed Jun. 6, 2012, and entitled "Controllable V-Notch in Spacecraft Antenna Pattern for Spacecraft Pointing and Orientation Determination," by David Rochblatt.

STATEMENT OF GOVERNMENT RIGHTS

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

This invention relates to systems and methods for antenna pointing. Particularly, this invention relates to systems and methods for antenna pointing and spacecraft orientation in satellite applications. This invention can also be utilized for: radar applications, missile applications, and other applications where accurate antenna and antenna platform pointing are needed.

2. Description of the Related Art

The need for precision pointing of antenna and instrumentation as well as spacecraft orientation is fundamental to spacecraft development. Thus, various techniques to achieve pointing accuracy have a long history in spacecraft design.

Spacecraft pointing precision for science instrumentation can ordinarily be achieved on the order of approximately 0.5 arc sec. However, when this pointing precision is transferred to the high-gain antenna (HGA), a pointing accuracy of only 0.5 to 1.0-degrees is typically achieved. Accordingly, to further improve the spacecraft pointing of its high gain antenna, a boresight of the high gain antenna against a ground station antenna signal is often conducted. The boresight costs in additional spacecraft fuel, takes a long time (i.e. hours) to complete and must be repeated every so often (every few months) depending on the application and link budget allocation.

Commercial geostationary (GEO) satellites typically employ known monopulse tracking systems to improve the satellites' pointing accuracies towards their designated Earth stations or any required direction. The monopulse system creates a feature (typically a notch) in the antenna far-field pattern, in the co-polarization component of the radiation. The monopulse system increases the spacecraft production cost by few million dollars as well as the satellite weight. The increase in satellite weight correspondingly increases the launch cost and places a limit on the servicable life expectancy of the satellite. The servicable life expectancy of the satellite is limited by the amount of fuel available on board the satellite, and thus its weight, for its designated position slot and as required for station keeping.

In view of the foregoing, there is a need in the art for improved apparatuses and methods for antenna pointing and spacecraft orientation. There is particularly a need for such apparatuses and methods to operate at a minimum cost and weight. Further, there is a need for such apparatuses and methods to be simple, efficient, and affordable. These and other needs are met by embodiments of the present invention as detailed hereafter.

SUMMARY OF THE INVENTION

Systems and methods for antenna pointing are disclosed. A transmit antenna system having an adjustable boresight transmits a signal exhibiting a far-field pattern including a feature (e.g. a V-Notch) in a polarization of the signal disposed at a fixed position off a beam peak of the far-field pattern. A receive antenna system detects the feature (which could be implemented by scans across, a monopulse system, or other methods) present in the far-field pattern in the polarization and determine a pointing error and correction of the adjustable boresight therefrom. The system may be applied to a cross-polarization of the signal where a co-polarization of the signal is simultaneously used for telecommunication.

A typical embodiment of the invention comprises an apparatus for determining antenna pointing, including a transmit antenna system for transmitting a signal having an adjustable boresight and exhibiting a far-field pattern including a feature in a polarization component of the far-field pattern disposed at a fixed position off a beam peak of the far-field pattern, and a receive antenna system for scanning across the far-field pattern in the polarization component to locate the feature and determine a pointing error and correction of the adjustable boresight therefrom. In other applications, e.g. a missile, the transmit antenna system must not have a boresight capability, yet pointing and trajectory correction can be computed by the receiving antenna system upon detecting the feature of the transmit antenna, and commands for trajectory corrections can then be transmitted to the missile. The "feature" of the far-field pattern may comprise a notch (or V-Notch) having a depth relative to a main lobe of the far-field pattern varying with an angle relative to a fixed position off the boresight. In addition, the feature may be disposed at the fixed position off the beam peak of the far-field pattern and mapped with the transmit antenna system installed to include any multipath effects from the satellite main structural body. Typically, the determined pointing error is then transmitted to the transmit antenna system and the boresight is adjusted to correct the pointing error. The transmit antenna system may be installed on a spacecraft and the receive antenna may be disposed at a ground station.

In some embodiments of the invention, the polarization component having the feature in the far-field pattern may be that of the cross-polarization of the signal and the co-polarization component of the signal is simultaneously used to communicate (transmit and/or receive) the main communication information while the receive antenna system determines the pointing error. In the case of circularly polarized radiation, the co-polarization component is commonly the right circular polarization (RCP) while the orthogonal cross-polarization component is a left circular polarization (LCP). In the case of linearly polarized radiation, the two orthogonal components would be Vertical and Horizontal.

In another embodiment of the invention, the feature in the far-field pattern of the antenna polarization component, may be switchably activated. In this case, for example, the feature will be present in the co-polarization component of the far-field pattern of the antenna, and the feature is only temporarily activated for the receive antenna system to determine the pointing error.

A typical method embodiment for determining antenna pointing, comprises transmitting a signal with a transmit antenna system having an adjustable boresight and exhibiting a far-field pattern including a feature in a polarization component of the far-field pattern disposed at a fixed position off a beam peak of the far-field pattern of the antenna, and scanning across the far-field pattern in the same polarization with a receive antenna system to locate the feature and determine a pointing error of the adjustable boresight therefrom. This method embodiment of the invention may be further modified consistent with the apparatus embodiments described herein.

Another typical embodiment of the invention may comprise an apparatus for determining antenna pointing, including a transmit antenna system means for transmitting a signal having an adjustable boresight and exhibiting a far-field pattern including a feature in a polarization component of the far-field pattern disposed at a fixed position off a beam peak of the far-field pattern of the antenna, and a receive antenna system means for determining a pointing error of the adjustable boresight from scanning across the far-field pattern in the polarization to locate the feature. This embodiment of the invention may be further modified consistent with the apparatus or method embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1A:
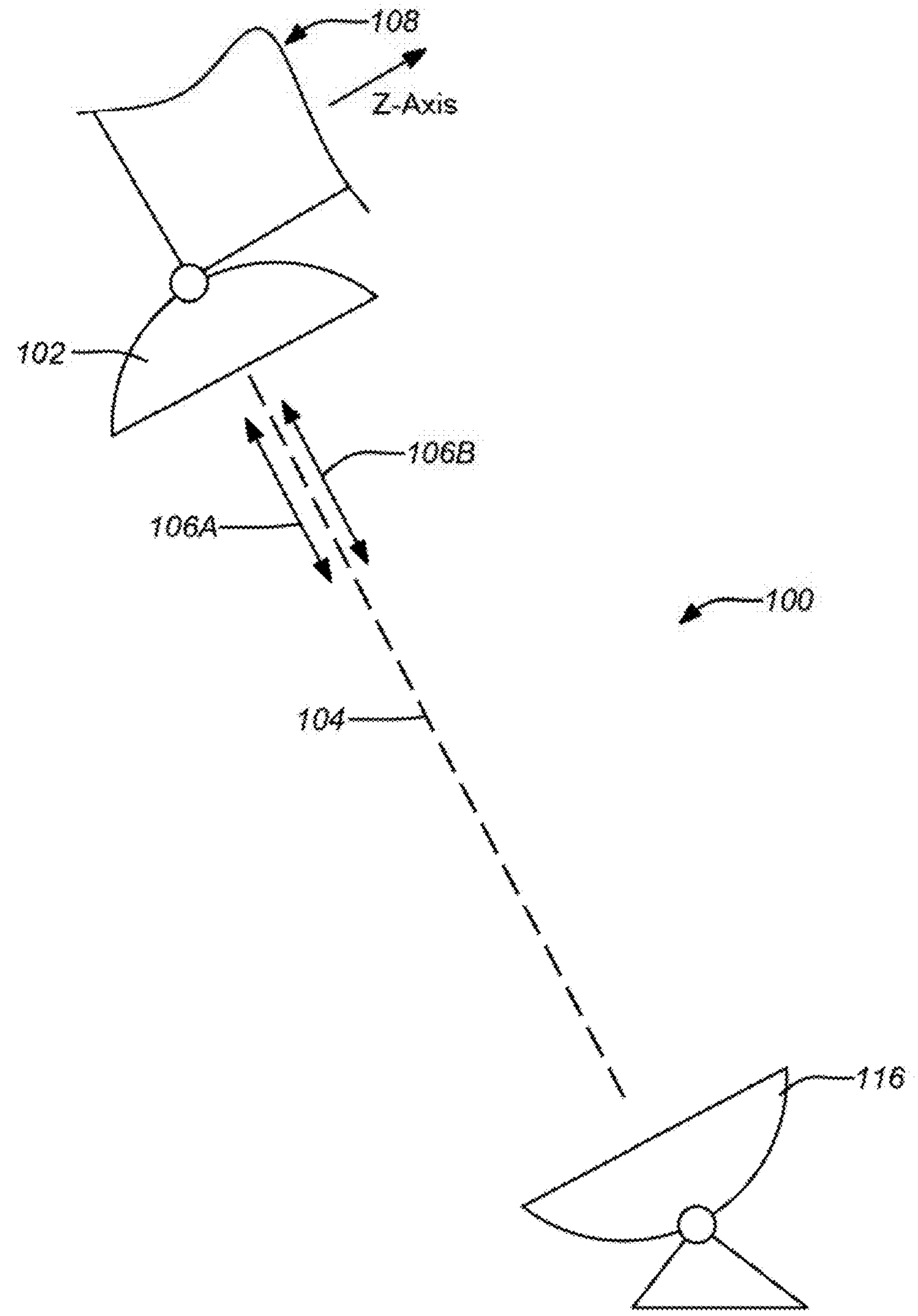
FIG. 1A is a schematic diagram of an exemplary embodiment of the invention for antenna pointing.

Embodiments of the invention are directed to a technique for pointing antenna that can be implemented to take advantage of signal nulls or v-notches in an antenna far-field pattern, i.e. "features" of the pattern which conventional wisdom would normally characterize as undesirable because they represent small absences of signal transmission in the overall antenna pattern. It should be noted that the term "v-notch" is a particular type of far-field pattern feature which may be employed in embodiments of the invention. However, those skilled in the art will appreciate that the principle of tracking a feature to determine pointing error as described herein may be readily applied to any other suitable pattern feature as long as it can be identified in a scan by a receive antenna system.

Similarly, embodiments of the invention are described herein based on signal patterns of particular polarizations (left circular polarization (LCP) and right circular polarization (RCP)) but those skilled in the art will also appreciate that the principle of the invention is not limited to any particular polarizations and may be applied to any polarization suitable for signal transmission.

Finally, those skilled in the art will also appreciate that although embodiments of the invention may be implemented using particular antenna elements (e.g. a corrugated feed horn, smooth horn feed, helical or dipole antennas or feeds, etc.), the inventive principle may be applied to virtually any known antenna system including any combination of elements which can produce a far-field pattern having features suitable for tracking. Accordingly, the term "antenna system" (transmit or receive) is used herein to refer generally to any such suitable antenna system. Those skilled in the art will also appreciate that there are numerous known techniques by which the far-field pattern may be altered as necessary to deliver the necessary features suitable for tracking in accordance with embodiments of the present invention.

In one notable example embodiment of the invention, the technique may be employed in a spacecraft high-gain antenna having a sharp V-Notch in its antenna far-field pattern main lobe. Significantly, this V-Notch can be designed in the LCP pattern (cross-polarization) so that the pointing correction may be performed (as described hereafter) without incurring any loss of telemetry data which is transmitted in on the main RCP pattern (co-polarization).

Alternatively (or complementarily), the V-Notch can be designed as part of the RCP pattern to provide determination of the spacecraft pointing and attitude while farther away. However, the V-Notch in the RCP pattern needs to be relatively narrow or under computer control, i.e. selectively activated. The width of the V-Notch in the RCP pattern will determine the period of time during which telemetry might not be transmitted. A controllable V-Notch, will not affect the telemetry when not activated. The V-Notch can enable the determination of the spacecraft pointing and attitude position with accuracies up to approximately 0.1*(A/D) radians, where A is the wavelength and D is the antenna diameter (in same units) and eliminates the need for a special boresight scheduling. In addition, spacecraft pointing and attitude position can be readily determined as a byproduct at the end of each telemetry pass.

Current technology for Deep Space mission spacecraft high gain antennas does not place active or passive components in high gain antenna to aid in its pointing. Embodiments of the present invention may incorporate a passive V-Notch or an active monopulse (e.g. in geosynchronous satellites) for better tracking of the spacecraft high gain antenna towards the ground station. In the current technology, a pointing error of the high gain antenna on the order of 0.5-deg is typically achieved without boresights. It is expected that embodiments of the present invention using a V-Notch can achieve a pointing error of a few to few tens of mdeg.

2. Far-Field Patterns and Polarized Signals

Antenna designers today are usually most interested only in the co-polar response (e.g. RCP) of the antenna as this polarization is used for signal transmission. This typically includes the principal planes E (phi=0-deg) and H (phi=90-deg). Thus, antenna designers typically pay little or no attention to the characterization of the cross-polarization response (e.g. LCP) of the antennas they design. Typically, the cross-polarization response for most antenna systems is significantly lower than the co-polar response—e.g. −25-dB below the copolar peak response. Commercial satellites in geosynchronous orbit are retroffited with strong enough transmitters, such that even with 25-dB of in the cross-polarization component of the radiation, it is sufficient for a typical Earth station antenna to lock on such signal and detect the V-Notch feature and thereby enabling the computation of pointing correction for the satellite. Accordingly, although the principle of the invention may be applied to any polarization, use of the cross-polarization field is ideal because this polarization of the transmit signal is not otherwise used for data transmission There are three significant aspects which should be considered in the cross-polarization design of the antenna systems with embodiments of the invention. The first and most dominant is the feed itself, which due to cancellation of the symmetric fields give rise to a V-Notch (null) signature in its cross-polarization pattern. The second aspect is the interaction of the feed pattern with the antenna main reflector surface (or surfaces for dual reflector system as an example). The third is the multipath interaction of diffractions between the antenna and the satellite body (or any body) to which it is attached. For commercial satellite antennas, corrugated and smooth wall horns are well suited for this application for example, although not limited to those two. The V-Notch can be achieved by any feed, feeding the antenna, be it conical or dipole antenna, etc.

When the antenna is being installed on a satellite, or other structure, the multipath reflections from the body of the spacecraft will interact with the cross-polar radiation of the antenna in a destructive or constructive fashion, to further enhance or mitigate these V-Notch nulls. Designing the antenna with special attention to these nulls and the interaction of the antenna patterns with multipath reflection to achieve the desired V-Notch (or other trackable pattern feature) characteristic, which can then be used as a pointing aid is one of the important embodiments of this invention. Other, less efficient horns (example smooth wall horn) which may give rise to a higher cross-polarization may be used for advantage in these designs.

Reflectarray antennas, as another example, by the virtue of having additional design control parameters (additional degrees of freedom) in the antenna design, e.g. by using different shaped patches, or in various orientation of these patches to one another, as well as a multi stack of patches, can provide a means to design a cross-polar antenna response with the appropriate V-Notch characteristic required to support the antenna pointing determination. Those skilled in the art will understand that all polarization types can be utilized with the reflectarray by sizing and orientation of the patches.

As described hereafter, incorporating a passive V-Notch (by design or happenstance) can be used to aid in the tracking of the spacecraft high gain antenna towards the ground station to achieve a pointing error of few to few tens of millidegrees or better (0.1*(λ/D) radians).

2. Exemplary Feature in Far-Field Pattern for Antenna Pointing

FIG. 1A is a schematic diagram of an exemplary embodiment of the invention for antenna pointing. The system 100 operates using a transmit antenna system 102 having an adjustable boresight 104. For example, the antenna system 102 may include a reflector on a gimbal that can be readily repositioned to change the pointing direction of the boresight 104 (in azimuth and elevation). In addition (or alternately), the boresight 104 of the antenna system 102 may be adjusted by reorienting the platform 108 (e.g. a satellite) on which it is installed. The boresight 104 may also be adjustable electronically through switching of various antenna components as will be understood by those skilled in the art. It should be noted that although the system 100 is described here having the transmit antenna system installed on a spacecraft 108 and the receive antenna disposed at a ground station, the inventive principle is applicable to any transmit and receive antennas employing polarized signals and requiring precision pointing.

The antenna system 102 transmits signals 106A and 106B which are polarized. (Note that the signals 106A, 106B are shown in the figure as two separate parallel arrows representing two different orthogonal polarizations that comprise the overall signal as will be understood by those skilled in the art. In addition, the two polarized components of the signal may be used to receive or transmit as indicated by each having bi-directional arrows.) To determine a pointing error of the boresight of the transmit antenna system 102, a receive antenna system 116 scan across the far-field pattern of the transmit antenna system 102 and locates a "feature" 112 in the far-field pattern 110. The transmit antenna system 102 may be installed in a known orientation relative to the satellite. In one example described hereafter, the depth of the detected feature and its location relative to the meridian crossing or the center of the scan of the received signal allow for the computation of pointing correction of the transmitting antenna in two axes.

Figure 1B:
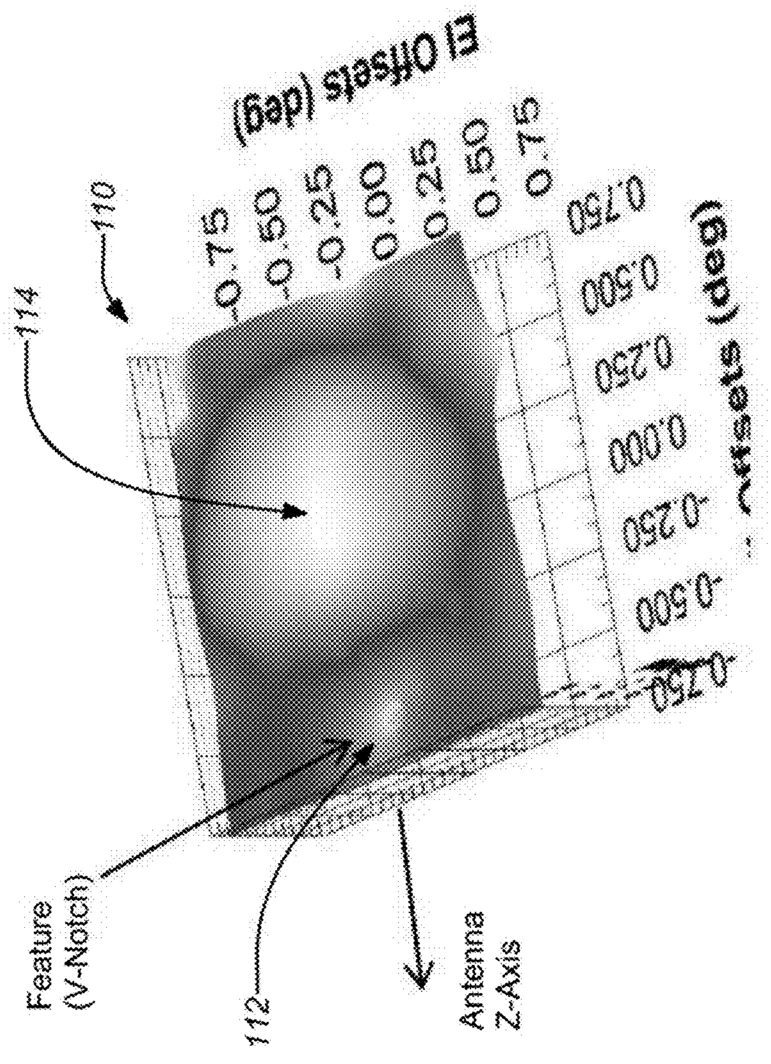
FIG. 1B is exemplary 2-dimensional (2-D) far-field pattern of a transmit antenna system showing a V-Notch feature for an embodiment of the invention.

FIG. 1B is exemplary far-field pattern 110 of a polarized pattern 106A from a transmit antenna system 102 for an embodiment of the invention. The example far-field pattern 110 exhibited by the transmit antenna system 102 includes a feature 112, e.g. a null or V-Notch. The feature 112 is disposed in the far-field pattern 110 at a fixed position off a beam peak 114 of the far-field pattern 110 of the polarized signal 106A. In one example, the feature 112 of the far-field pattern may comprises a notch (null) in the signal pattern 110 having a depth (i.e. a signal suppression) relative to a main lobe of the far-field pattern varying with an angle of the fixed position off the boresight 104. Accordingly, the pointing error (i.e. the deviation of the boresight 104 off being pointed directly at the receive antenna system 116) may be analytically inferred from the measured depth of the V-Notch from the scan by the receive antenna system 116. Those skilled in the art will appreciate that other features may also be developed in the signal pattern of transmit antenna systems having measurable properties from which pointing error of the transmit antenna system can be analytically inferred. The pointing error may then be transmitted to the transmit antenna system (or satellite) so the boresight may be adjusted to correct the pointing error. The adjustment may involve either repositioning the transmit antenna on the satellite, reposition and/or reorienting the satellite or both.

In the example application to satellite communications, it should also be noted that the orbit type of the satellite will affect the details of the scanning operation by the received antenna system 116 as will be understood by those skilled in the art. However, the principle of the signal scan is performed identically regardless of the orbit type; in all cases, the receive antenna effectively is swept across the polarized transmitted signal to measure signal strength at various relative pointing positions. For example, in the simplest case of the transmit antenna disposed on a satellite in a geostationary orbit with the satellite orientation and relative position of the transmit antenna fixed relative to the Earth, the scan may be simply performed by sweeping the receive antenna system across the received signal. However, with other lower orbit types where the satellite makes a pass across the field of view of the receive antenna system, the scan must account for the satellite position and orientation as well as the relative position of the transmit antenna system boresight on the satellite. For example, a low orbiting satellite using a transmit antenna system fixed relative to the spacecraft body may orbit the Earth and maintain a fixed orientation relative to the Earth. In this case, the receive antenna system will necessarily move to maintain its pointing at the satellite but the sweep of the signal is a function of the orbital motion due to the pointing direction of the transmit antenna changing as the satellite moves from rise to set across the field of view of the receive antenna system. Based on the orbital application and antenna type, those skilled in the art can readily develop an appropriate scanning approach fulfill the principle of the invention described herein to locate the signal pattern feature.

The derivation of the pointing corrections for the satellite can be achieved is several ways. In the examples shown here, it is the deviation of the V-Notch minimum 208, 308 from the meridian crossing, 205, 305 and its depth are proportional to the yaw and pitch pointing errors (corresponding to cross-elevation and elevation pointing errors for example) For Commercial geosynchronous satellite implementation mode, detecting the feature, or V-Notch can be achieved with, two sweeps in perpendicular planes (elevation and cross-elevation, or Hour-angle (HA) and declination) by the receive antenna system which will yield a complete result of the pointing error. Sweeps different planes may be accomplished differently for the same orbit, e.g. a sweep in one plane from the orbital motion and the other plane by receive antenna motion.) It should also be noted that proper correlation between the pointing error and the notch depth in a particular application may be determined computationally or experimentally (i.e. through signal measurement on the ground).

Figure 2A:
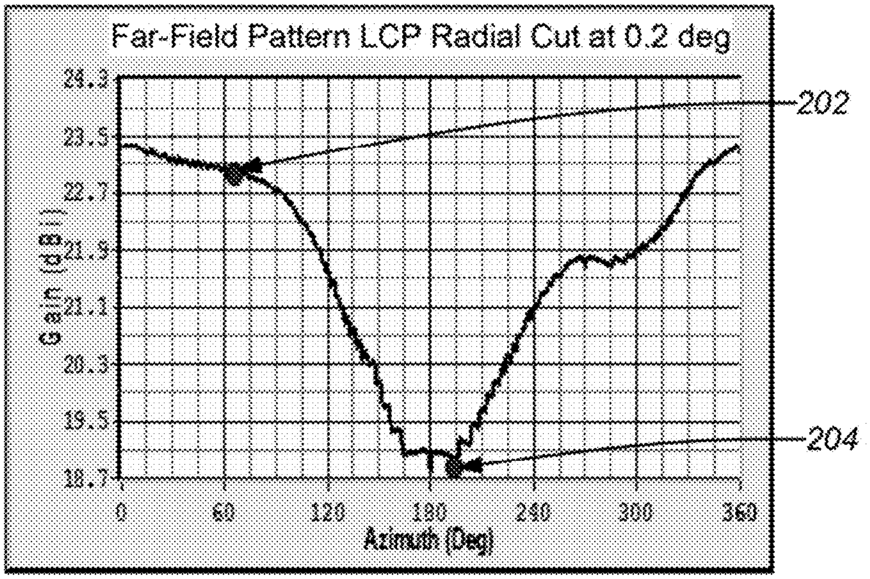
FIG. 2A is exemplary 1-dimensional (1-D) cut around the 2-D plot of FIG. 1B at a position of 0.2-degrees away from its boresight, beam-peak location, showing the V-Notch nature of the feature with a relative depth of approximately 4.4-dB.
Figure 2B:
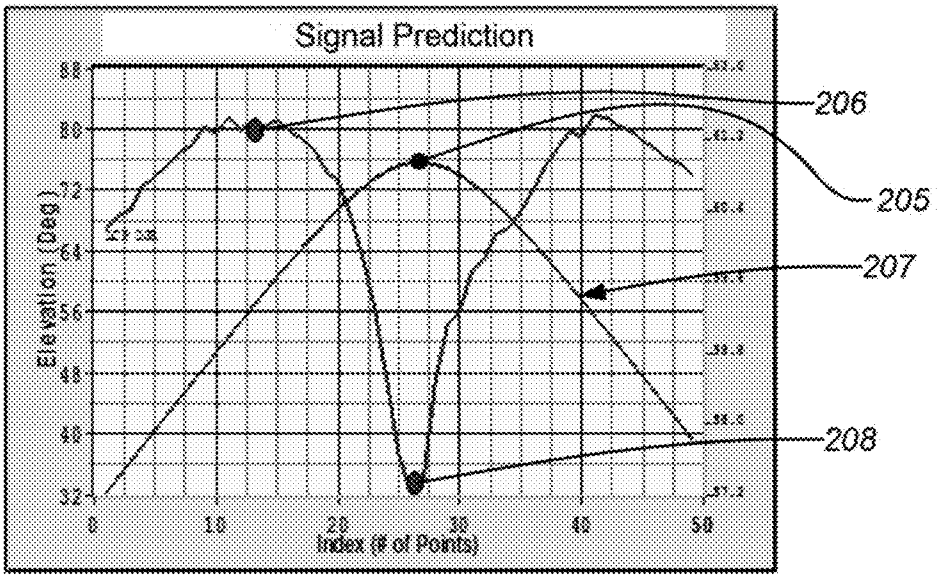
FIG. 2B is an exemplary plot of a simulated scan by the receive antenna system for locating the feature in the far-field pattern of the transmit antenna showing that for this perfect yaw orientation, the depth (fade) in the signal is approximately 4.8-dB. Also plotted is the trajectory of the transmit antenna against the received antenna (smooth curve) for an embodiment of the invention.

FIGS. 2A and 2B are exemplary plots of scans from a receive antenna system for locating a feature in the far-field pattern for an embodiment of the invention. In this example, the feature is a V-Notch in the antenna far-field pattern whose depth is proportional to the off-boresight angle. In this case, a V-Notch of approximately 4.4-dB shown by the scan results of FIG. 2A (between points 202 and 204) occurs at approximately 0.2-deg off-boresight angle shown by the analytical plot of FIG. 2B (right vertical axis between points 206 and 208), causing an approximately 4.8-dB drop in the signal strength. The plot of FIG. 2B shows the detection of the V-Notch by antenna system 116. The spacecraft trajectory relative to the antenna system 116 is shown by 207. The minimum of the V-Notch signal is at 208 and corresponding to the meridian crossing occurred at 205, indicating an almost perfect yaw by the satellite. The depth of the V-Notch, of 4.8-dB is proportional to the pointing error in pitch of 0.2-degrees (FIG. 2A).

Figure 3A:
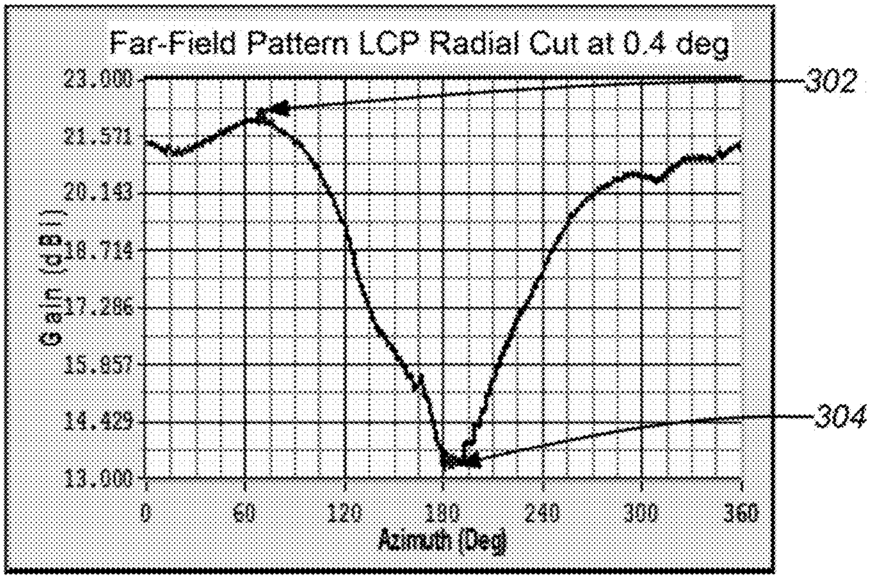
FIG. 3A is exemplary 1-dimensional (1-D) cut around the 2-D plot of FIG. 1B at a position of 0.4-degrees away from its boresight, beam-peak location, showing the V-Notch nature of the feature with a relative approximate depth of 8.0-dB.
Figure 3B:
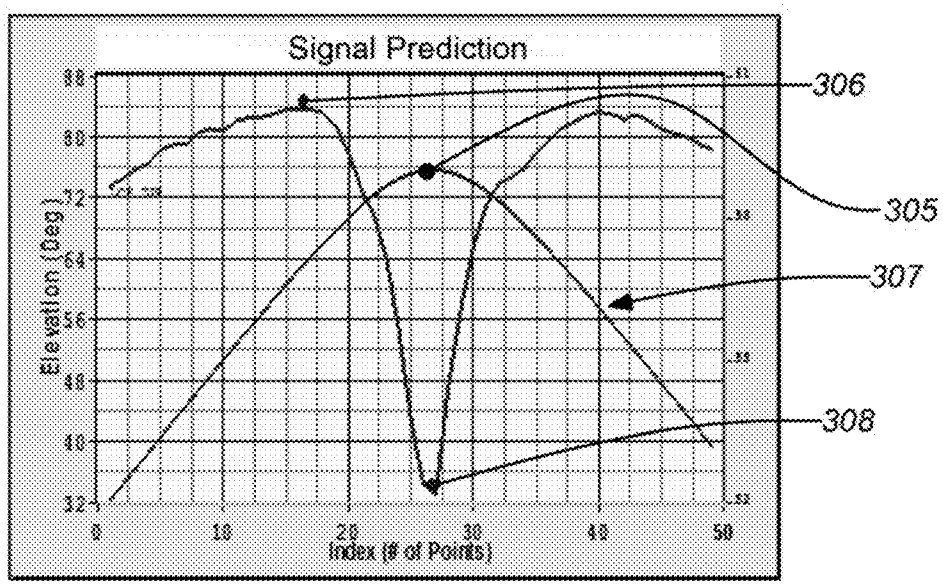
FIG. 3B is an exemplary plots of a simulated scans from a receive antenna system for locating a feature in the far-field pattern, showing that for this perfect yaw orientation, the depth (fade) in the signal is approximately 5.2-dB (indicating a lower pitch angle by the transmitting antenna relative to the receiving antenna) for an embodiment of the invention. Also plotted is the trajectory of the transmit antenna against the received antenna (smooth curve)

FIGS. 3A and 3B are exemplary plots of scans from the receive antenna system for locating a feature in the far-field pattern for an embodiment of the invention showing an example of greater pointing error with the same system of the example of FIGS. 2A & 2B. In this case, a V-Notch of approximately 8.5-dB shown by the scan results of FIG. 3A (between points 302 and 304) occurs at approximately 0.4-deg off-boresight angle. FIG. 3B shows that the receiving antenna system 116 detected the V-Notch with a deeper depth of approximately 5.2-dB, which is proportional to the larger pitch pointing error of 0.4-degrees of the satellite towards the Earth station. In this example the yaw of the satellite is kept perfect, such that point 308 is exactly below point 305.

As previously mentioned, embodiments of the invention may be implemented with any polarized signal. Typically, in antenna design the main polarization component, i.e. the co-polarization, is utilized for transmitting all the communication data for which the antenna system is designed. This may include but is not limited to telemetry, tracking, and command (TT&C). The cross-polarization component of the pattern is typically disregarded. Embodiments of the invention may take advantage of this by using the cross-polarization component of the pattern simultaneously to determine the improved boresight of the transmitting antenna system by the receiver antenna system as previously described while the primary co-polarization is unaffected and maintains signal transmission. In many applications, the co-polarization of the signal may comprise a right circular polarization (RCP) while the cross-polarization of the signal comprises a left circular polarization (LCP). Those skilled in the art will appreciate that embodiments of the invention are also operable with linear mode transmitting antennas using vertical and horizontal polarizations as well.

In addition, while it may be desirable to make use of the neglected cross-polarization to enhance antenna pointing, it is not necessary. Employing embodiments of the invention may be implemented in the co-polarization as well, e.g. to improve range of the correction operation. In this case, however, the feature in the far-field pattern of the polarization component may be switchably activated, i.e. turn on or off as needed, to limit any possible negative effect on the transmitted signal in the co-polarization. In this case, the feature in the far-field pattern of the co-polarized component is only temporarily activated for the receive antenna system to determine the pointing error. Switched control of the feature may also be used in the cross-polarization as well although it is less likely to be needed.

In one notable example embodiment, a spacecraft high gain antenna (HGA) having a sharp V-Notch in its far-field pattern can be used to determine the spacecraft pointing and attitude relative to the Earth receiving antenna station. The notch depth, relative to the antenna farfield main-lobe, needs to vary with the off boresight angle. By tracking the spacecraft from the observation antenna (on Earth for example), from rise to set (which is the usual technique for tracking a moving spacecraft), and recording the received signal at the receiving antenna, determination of the spacecraft pointing and attitude errors can be computed with great accuracy. The location of the V-Notch in the complete rise-to-set recorded signal relative to the meridian crossings is used to determine the spacecraft attitude error (pointing in the cross-elevation) direction. The depth of the V-Notch may be used to determine the spacecraft pointing errors in the elevation (up and down) direction (relative to the receiving antenna). Significantly, if the V-Notch is incorporated into the LCP pattern of the spacecraft HGA, then, such diagnostics can be achieved without loss of telemetry data which is typically transmitted on the RCP channel. If the V-Notch is designed in the RCP pattern of the antenna, it may be controlled by a ground command such that it is activated only when such diagnostics are needed. Designing the spacecraft High-Gain antenna with a sharp V-Notch in its antenna far-field pattern main lobe response. The V-Notch can be designed in the Left Circular Polarization (LCP) pattern, which is also referred here as the crosspole response. The advantage is that the telemetry data which is being transmitted on the Right Circular Polarization (RCP) pattern, referred here as the copole response, will not be affected or degraded by embodiments of the present invention operating to correct antenna pointing.

It is important to note that the principles described here hold true for all forms of polarizations whether circular, linear or elliptical. In addition, embodiments of the invention may be applied to all forms of antennas design as previously explained. Thus, the universally accepted so-called Ludwig Third definition (Ludwig, A. C.: "The definition of cross-polarization", IEEE Trans., 1973, AP-21, pp. 116-119, which is incorporated by reference herein) which defines the reference polarization as that of a Huygens source. Therefore the co-polarization of the signal may be defined as the radiation pattern of the antenna system (or a horn antenna) in any plane and angle with respect to the reference axis, where the field is parallel to the field of the source and the cross-polarization of the signal is the orthogonal component. It is the design of the copolar and crosspolar responses of the overall antenna system that are significant in embodiments of the present invention described herein as will be understood by those skilled in the art. Commonly in space applications, the RCP may be employed as the copolar radiation making LCP the crosspolar radiation.

Alternatively, as previously mentioned, the V-Notch can be designed as part of the RCP pattern (e.g. in the co-polarization) to provide for determination of the spacecraft pointing and attitude when the satellite or spacecraft is farther away from Earth or its designated communication target wherever it may be. The reason is that the LCP pattern (in the cross-polarization) is typically suppressed by approximately 20 to 30-dB below the co-polarization pattern and therefore places a limit on the achievable range due to the diminished Signal to Noise Ratio (SNR). However, any V-Notch employed in the RCP pattern should be narrow and could be selectively activated, e.g. under computer control.

A selectively activated V-Notch will not affect the telemetry when not activated. Those skilled in the art will appreciate that the signal pattern of an antenna system may be readily altered through switching of any number of electrical or physical antenna elements. The design (including possible selectively activating) a V-Notch or any other suitable pattern feature in an antenna system can be accomplished by one skilled in the art without undue experimentation or effort. The V-Notch can enable the determination of the spacecraft pointing and attitude position with accuracies to 5 to 50 millidegrees (or 0.1*(A/D) radians) and does not require a special boresight scheduling as it can be determined as a byproduct at the end of each telemetry pass (in non-GEO orbit applications).

As previously mentioned, eliminating the need for a monopulse system by employing embodiments of the invention yields the advantages of reducing the satellite production cost and weight. The weight reduction may then be utilized for additional fuel stored on board the satellite and thereby increasing its service life expectancy.

4. Exemplary Method of Antenna Pointing

Figure 4:
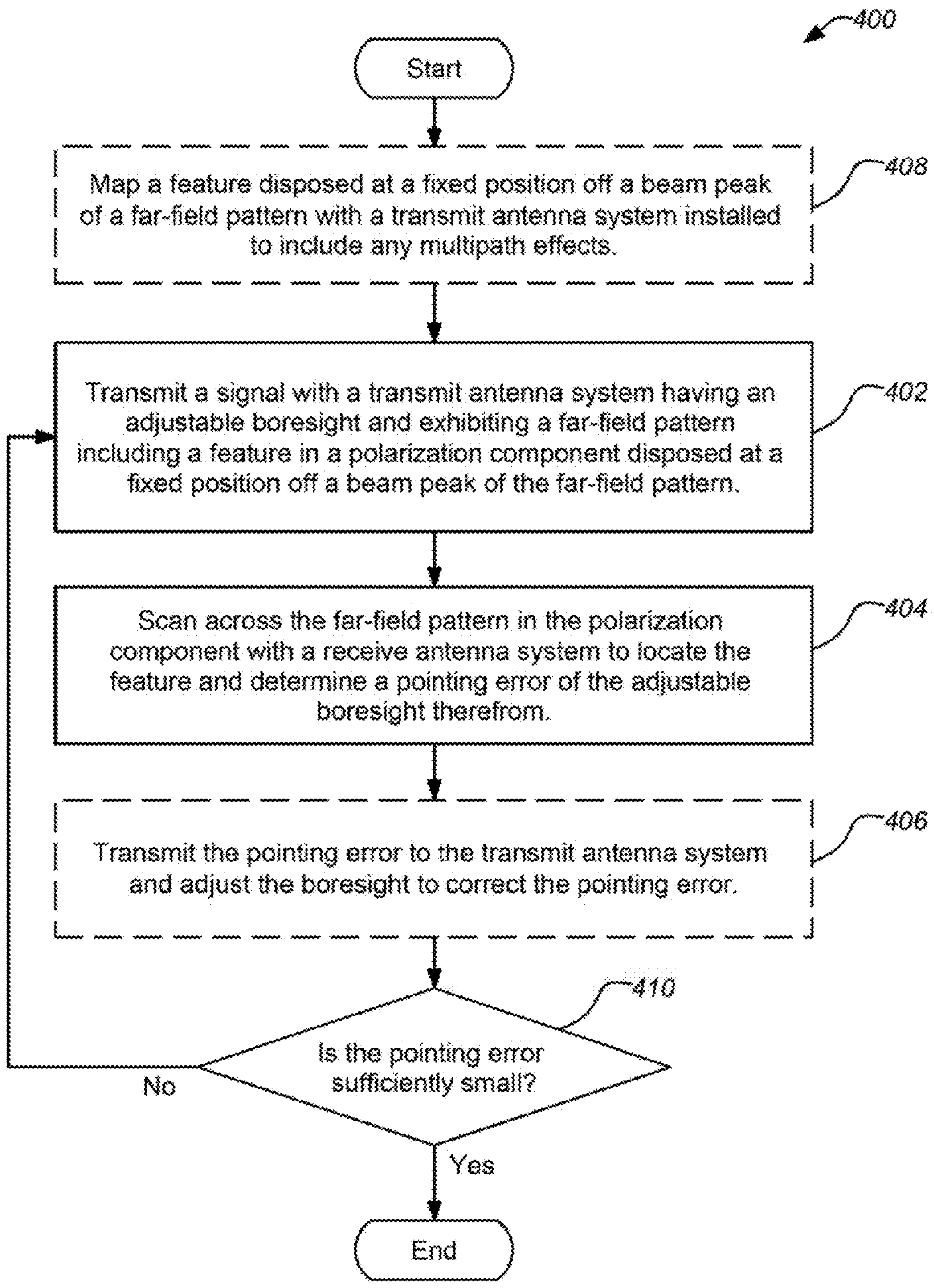
FIG. 4 is a flowchart of an exemplary method of pointing an antenna according to an embodiment of the invention.

FIG. 4 is a flowchart of an exemplary method 400 of pointing an antenna according to an embodiment of the invention. The method 400 includes an operation 402 of transmitting a signal with a transmit antenna system having an adjustable boresight and exhibiting a far-field pattern including a feature in a polarization component disposed at a fixed position off a beam peak of the far-field pattern. Next in operation 404, a receive antenna system is scanned across the far-field pattern in the polarization component to locate the feature and determine a pointing error of the adjustable boresight therefrom. This basic method 400 may be further modified consistent with the various apparatus embodiments previously described. For example, some embodiments may include the additional operation 406 of transmitting the pointing error to the transmit antenna system and adjusting the boresight of the transmit antenna system to correct the pointing error. The process may be performed iteratively using decision block 410 to check the pointing error magnitude and return to operation 402 if it is not. Similarly, the method 400 may also include the operation 408 of mapping the feature disposed at the fixed position off the beam peak of the far-field pattern of the signal with the transmit antenna system installed to include any multipath effects. It is important to also note that the steps may be performed in any suitable order (or even simultaneously in some cases) as will be appreciated by those skilled in the art.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for determining antenna pointing, comprising:

a transmit antenna system for transmitting a signal having an adjustable boresight and exhibiting a far-field pattern including a feature in a polarization component of the far-field pattern disposed at a fixed position off a beam peak of the far-field pattern; and a receive antenna system for scanning across the far-field pattern in the polarization component to locate the feature and determine a pointing error of the adjustable boresight therefrom;

wherein the feature of the far-field pattern comprises a notch having a depth relative to a main lobe of the far-field pattern varying with an angle of the fixed position off the boresight.

2. The apparatus of claim 1, wherein the feature disposed at the fixed position off the beam peak of the far-field pattern is mapped with the transmit antenna system installed to include any multipath effects.

3. The apparatus of claim 1, wherein the pointing error is transmitted to the transmit antenna system and the boresight is adjusted to correct the pointing error.

4. The apparatus of claim 1, wherein the transmit antenna system is installed on a spacecraft and the receive antenna is disposed at a ground station.

5. The apparatus of claim 1, wherein the polarization component having the feature in the far-field pattern is a cross-polarization component and a co-polarization component is simultaneously used to communicate while the receive antenna system determines the pointing error.

6. The apparatus of claim 5, wherein the co-polarization component comprises a right circular polarization (RCP) and the cross-polarization component comprises a left circular polarization (LCP).

7. The apparatus of claim 1, wherein the feature in the far-field pattern of the polarization component is switchably activated.

8. The apparatus of claim 7, wherein the polarization component having the feature in the far-field pattern is a co-polarization component and the feature is only temporarily activated for the receive antenna system to determine the pointing error.

9. A method for determining antenna pointing, comprising:

transmitting a signal with a transmit antenna system having an adjustable boresight and exhibiting a far-field pattern including a feature in a polarization component of the far-field pattern disposed at a fixed position off a beam peak of the far-field pattern; and scanning across the far-field pattern in the polarization component with a receive antenna system to locate the feature and determine a pointing error of the adjustable boresight therefrom;

wherein the feature of the far-field pattern comprises a notch having a depth relative to a main lobe of the far-field pattern varying with an angle of the fixed position off the boresight.

10. The method of claim 9, further comprising mapping the feature disposed at the fixed position off the beam peak of the far-field pattern with the transmit antenna system installed to include any multipath effects.

11. The method of claim 9, further comprising transmitting the pointing error to the transmit antenna system and adjusting the boresight to correct the pointing error.

12. The method of claim 9, wherein the transmit antenna system is installed on a spacecraft and the receive antenna is disposed at a ground station.

13. The method of claim 9, wherein the polarization component having the feature in the far-field pattern is a cross-polarization component and a co-polarization component is simultaneously used to communicate while the receive antenna system determines the pointing error.

14. The method of claim 13, wherein the co-polarization component comprises a right circular polarization (RCP) and the cross-polarization component comprises a left circular polarization (LCP).

15. The method of claim 9, wherein the feature in the far-field pattern of the polarization component is switchably activated.

16. The method of claim 15, wherein the polarization component having the feature in the far-field pattern is a co-polarization component and the feature is only temporarily activated for the receive antenna system to determine the pointing error.

17. An apparatus for determining antenna pointing, comprising:

a transmit antenna system means for transmitting a signal having an adjustable boresight and exhibiting a far-field pattern including a feature in a polarization component disposed at a fixed position off a beam peak of the far-field pattern; and a receive antenna system means for determining a pointing error of the adjustable boresight from scanning across the far-field pattern in the polarization component to locate the feature;

wherein the feature of the far-field pattern comprises a notch having a depth relative to a main lobe of the far-field pattern varying with an angle of the fixed position off the boresight.

18. The apparatus of claim 17, wherein the feature of the far-field pattern is mapped with the transmit antenna system means installed to include any multipath effects.

* * * * *